(12) United States Patent
Gong et al.

(10) Patent No.: US 10,732,612 B2
(45) Date of Patent: Aug. 4, 2020

(54) SINGLE ASSEMBLY LINE APPARATUS FOR AUTOMATIC APPLICATION OF SEVERAL TYPES OF STICKER

(71) Applicants: SHENZHEN FUTAIHONG PRECISION INDUSTRY CO., LTD., Shenzhen (CN); FIH (HONG KONG) LIMITED, Kowloon (HK)

(72) Inventors: Rui-Ning Gong, Shenzhen (CN); Zhi-Shan Chen, Shenzhen (CN); Bing Yu, Shenzhen (CN)

(73) Assignees: SHENZHEN FUTAIHONG PRECISION INDUSTRY CO., LTD., Shenzhen (CN); FIH (HONG KONG) LIMITED, Kowloon (HK)

( * ) Notice: Subject to any disclaimer, the term of this patent is extended or adjusted under 35 U.S.C. 154(b) by 48 days.

(21) Appl. No.: 16/028,556

(22) Filed: Jul. 6, 2018

(65) Prior Publication Data
US 2019/0302743 A1    Oct. 3, 2019

(30) Foreign Application Priority Data
Mar. 29, 2018    (CN) .......................... 2018 1 0282185

(51) Int. Cl.
*H04L 29/08* (2006.01)
*G05B 19/418* (2006.01)
*B25J 11/00* (2006.01)
*G06T 1/00* (2006.01)

(52) U.S. Cl.
CPC ..... *G05B 19/41805* (2013.01); *B25J 11/0075* (2013.01); *G06T 1/0014* (2013.01); *H04L 67/125* (2013.01); *G05B 2219/31186* (2013.01)

(58) Field of Classification Search
None
See application file for complete search history.

(56) References Cited

U.S. PATENT DOCUMENTS

| | | | |
|---|---|---|---|
| 6,600,829 B1 * | 7/2003 | Affeldt .................... | B07C 5/342 209/509 |
| 6,747,687 B1 * | 6/2004 | Alves ..................... | H04N 7/188 340/932.2 |
| 7,890,348 B2 * | 2/2011 | Aluri ....................... | A61B 5/00 705/3 |
| 7,969,309 B2 * | 6/2011 | Abe ........................ | B65C 1/042 340/572.1 |

(Continued)

*Primary Examiner* — Shadan E Haghani
(74) *Attorney, Agent, or Firm* — ScienBiziP, P.C.

(57) ABSTRACT

An assembly line apparatus for the automatic application of different types of labels or cushions or glue ("stickers") on a workpiece has a transportation device, a plurality of application devices, a central control device, and a first expansive cooperation device. The central control device has first and other communication ports which may each function in accordance with different protocols and standards. The central control device is electronically connected to the transportation device via the first communication port and electronically connected to the application devices via a second or further communication ports. The first expansive cooperation device generates first and second control signals to instruct, via the central control device, the transportation device to move or to stop and to the application devices to apply or not to apply certain stickers on a certain area of a workpiece.

20 Claims, 8 Drawing Sheets

(56) References Cited

U.S. PATENT DOCUMENTS

| | | | |
|---|---|---|---|
| 2003/0214953 A1* | 11/2003 | El-Demerdash | H04L 12/403 370/400 |
| 2008/0117055 A1* | 5/2008 | Blake | G06K 7/0008 340/572.7 |
| 2010/0211670 A1* | 8/2010 | Caldwell | G05B 19/4183 709/224 |
| 2014/0201094 A1* | 7/2014 | Herrington | G06K 9/00577 705/317 |
| 2015/0077015 A1* | 3/2015 | Howell | G01R 22/10 315/294 |
| 2016/0364927 A1* | 12/2016 | Barry | H04L 63/08 |
| 2017/0246650 A1* | 8/2017 | Abernathy | H05K 3/0008 |

\* cited by examiner

SINGLE ASSEMBLY LINE APPARATUS FOR AUTOMATIC APPLICATION OF SEVERAL TYPES OF STICKER

FIELD

The disclosure relates to an assembly line apparatus for automatic sticker application, and more particularly to an assembly line apparatus with at least one expansive cooperation device.

BACKGROUND

The electronic device can comprise a plurality of electronic components on one or more main boards located in a casing. To prevent the electronic components from damage, there may be a cushion on an inner surface of the casing. The cushion is, for example, applied on the inner surface of the casing by a piece of double-sided adhesive, or formed by application a piece of plastic foam on the inner surface of the casing. Furthermore, the main board of the electronic device or certain electronic components may need an identification stamp. Even more, certain electronic components need to be applied with insulation glue or waterproof glue.

The stamp, insulation glue, waterproof glue, plastic foam, or cushion is applied on the inner surface of the casing, on the main board, or on the electronic components manually. However, manual application is high cost and low in efficiency and is error-prone. Hence, automatic processes are desirable.

However, a workpiece may need more than one sticker. For example, one main board may need two or more stamps and/or insulation glue. Furthermore, the inner surface of the casing may need cushions with different thickness in different areas if the height of electronic components varies. In addition, a cushion/plastic foam with special material such as high-density foam may be desired in certain area on the inner surface of the casing while conventional cushion/plastic foam is needed in other area. An apparatus capable of efficiently application a plurality of stickers on one workpiece is needed.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
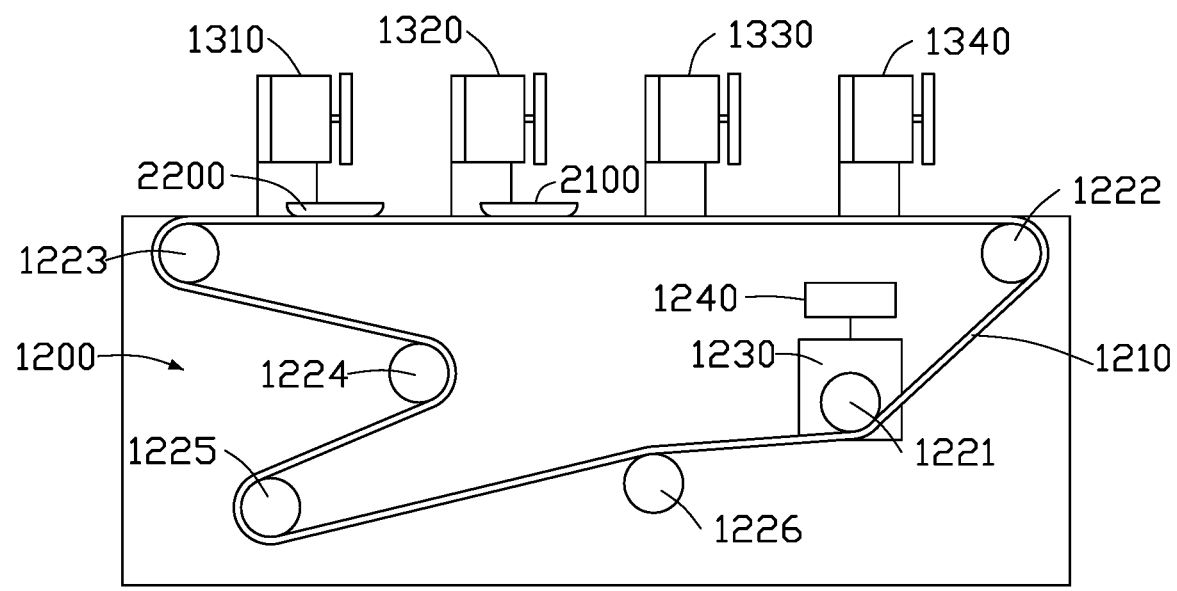
FIG. 1 is a structural schematic of an assembly line apparatus for automatic sticker application in one embodiment of the disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series, and the like.

The present disclosure is described in relation to an assembly line apparatus.

Figure 2:
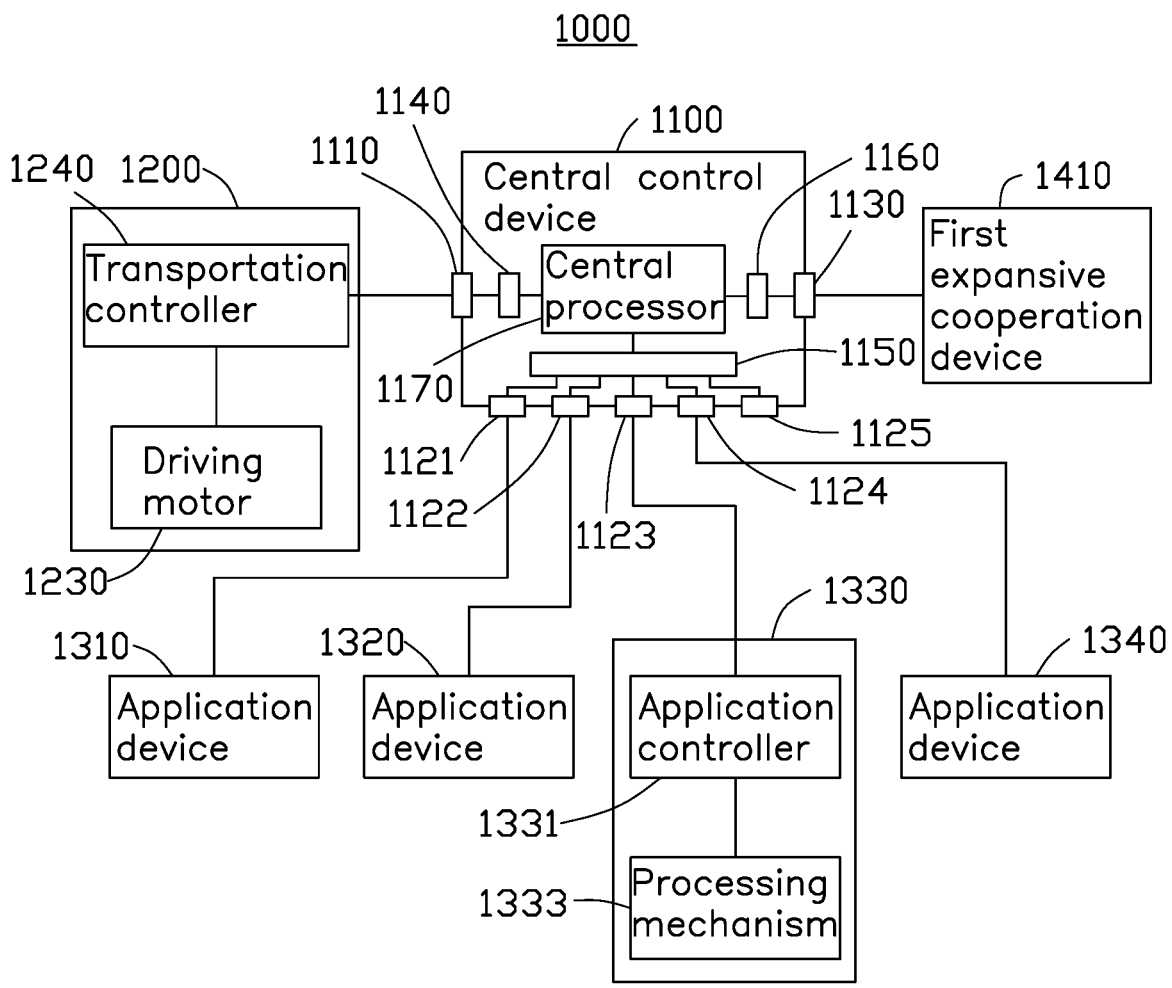
FIG. 2 is a functional block diagram corresponding to the assembly line apparatus in FIG. 1.

FIG. 1 is a structural schematic of an assembly line apparatus for automatic sticker application, and FIG. 2 is a functional block diagram of the assembly line apparatus in FIG. 1. In one embodiment, the assembly line apparatus (assembly line apparatus 1000) for automatic sticker application has a central control device 1100, a transportation device 1200, a plurality of application devices and a first expansive cooperation device 1410. The plurality of application devices comprises a first application device 1310, second application device 1320, third application device 1330, and fourth application device 1340. The transportation device 1200 is connected to the aforementioned four application devices and the central control device 1100. The central control device 1100 is electronically connected to the transportation device 1200, the four application devices, and the first expansive cooperation device 1410. The embodiment shown in FIG. 1 and FIG. 2 an exemplary embodiment, and the number of the application devices is not limited to four. The number is not less than two. In one embodiment, the number of the application devices is ten.

Figure 3:
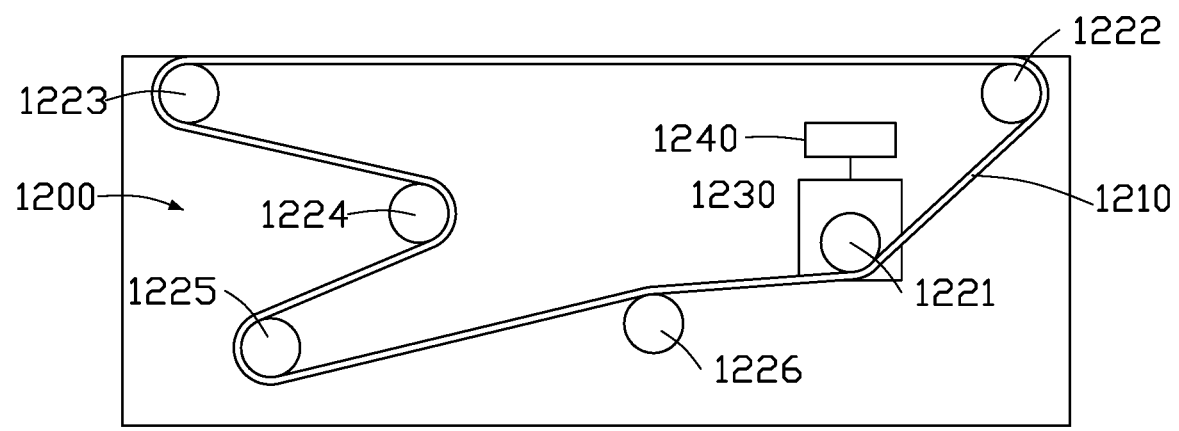
FIG. 3 is a structural schematic of a transportation device in the assembly line apparatus in FIG. 1 in one embodiment.

FIG. 3 shows a transportation device 1200 in one embodiment. As shown in FIG. 3, the transportation device 1200 has a conveyor 1210, a plurality of wheels, a driving motor 1230, and a transportation controller 1240. The plurality of wheels, including a first wheel 1221, a second wheel 1222, a third wheel 1223, a fourth wheel 1224, a fifth wheel 1225, and a sixth wheel 1226 are all in contact with the conveyor 1210, so that when one of the wheels rotates, the conveyer 1210 is driven and thereby drives the other wheels to rotate. Taking FIG. 3 for example, the first wheel 1221 is connected to and driven by the driving motor 1230. Hence, when the driving motor 1230 receives an instruction from the transportation controller 1240, the driving motor 1230 drives the first wheel 1221 to rotate so that the conveyor 1210 is driven. The second to sixth wheels 1222 to 1226 support the conveyor 1210 and ensure that the instant position of the conveyor 1210 is correct. The transportation controller 1240 receives a first control signal, and controls the driving motor 1230 to work or to stop based on the received first control signal.

The first application device 1310, the second application device 1320, the third application device 1330, and the fourth application device 1340 each device applies labels or cushions or glue (hereinafter "stickers") to a workpiece. Taking the third application device 1330 for example, the third application device 1330 has a application controller 1331 and a processing mechanism 1333. The application controller 1331 controls and drives the processing mechanism 1333 to apply the sticker onto a certain area of the workpiece based on a received second control signal.

The central control device 1100 is electronically connected to the transportation device 1200, the first application device 1310, the second application device 1320, the third application device 1330, the fourth application device 1340, and the first expansive cooperation device 1410. The central control device 1100 has many communication ports and these communication ports correspond to a variety of communication physical layers. For example, the central control device 1100 is, for example, an MCGS7062Hi embedded controller having at least one first communication port 1110 adapted to TCP/IP protocol, a plurality of second communication ports 1221~1225 adapted to RS-485 standard, at least one third communication port 1130 adapted to RS-232 standard, a physical layer circuit 1140, a physical layer circuit 1150, a physical layer circuit 1160, and at least one central processor 1170. The physical layer circuit 1140 converts the information or command being sent to the first communication port 1110 from the central processor 1170 to an electronic signal based on a first communication protocol/standard, to send out the information or command via the first communication port 1110. The physical layer circuit 1140 is also configured to convert an electronic signal, received by the first communication port 1110 from an external device and intended for the central control device 1100, to an information packet based on the first communication standard/protocol, for the central processor 1170. The physical layer circuit 1150 is configured to convert the information being sent to one of the second communication ports 1121~1125 from the central processor 1170 to an electronic signal based on a second communication protocol/standard so as to send out the information via the second communication port, and convert in reverse an information packet based on the second communication protocol/standard for forwarding to the central processor 1170. The physical layer circuit 1160 performs similar functions in relation to the third communication port 1130. Hence, the central control device 1100 is capable of communicating with any device electronically connected thereto with a variety of communication protocols/standards. In the aforementioned embodiment, the TCP/IP protocol is taken as the first communication protocol/standard while the RS-485 standard is taken as the second communication protocol/standard and the RS-232 standard is taken as the third communication protocol/standard. In the disclosure, the central control device has at least two types of communication port each supporting a different communication protocol/standard. The number of types of communication port is not limited and the number of different communication protocols/standards is also not limited. Selection of a or the communication protocol/standard is a design preference.

In one embodiment of the disclosure, the first expansive cooperation device 1410 has a communication port adapted to RS-232 standard, and the first expansive cooperation device 1410 communicates accordingly with the central control device 1100. The transportation controller 1240 of the transportation device 1200 has a communication port adapted to TCP/IP protocol, and the transportation controller 1240 communicates accordingly with the central control device 1100. The controller of each of the first application device 1310, the second application device 1320, the third application device 1330, and the fourth application device 1340 has a communication port adapted to RS-485 standard, and each application device communicates accordingly with the central control device 1100. Devices with different protocols/standards are able to communicate with each other via the central control device 1100.

Explicitly, when the central control device 1100 receives the electronic signal from the first communication port 1100, the physical layer circuit 1140, corresponding to the first communication port 1110, in the central control device 1100 converts the received electronic signal to information capable of being processed by the central processor 1170. The signal from the first communication port 1110 is, for example, to be sent to the first expansive cooperation device 1410, so the central processor 1170 of the central control device 1100 sends the information to the physical layer circuit 1160, and the physical layer circuit 1160 converts the information to an electronic signal adapted to the third communication protocol/standard, the signal then being sent to the first expansive cooperation device 1410 via the third communication port 1130.

When the central control device 1100 receives the electronic signal from the first expansive cooperation device 1410 via the third communication port 1130, the physical layer circuit 1160, corresponding to the third communication port 1130, in the central control device 1100 converts the electronic signal to information capable of being processed by the central processor 1170 based on the third communication protocol/standard. In one embodiment, the aforementioned signal from the third communication port 1130 is, for example, to be sent to the first application device 1310, so the central processor 1170 in the central control device 1100 sends the received information to the physical layer circuit 1150. The physical layer circuit 1150 converts the information to an electronic signal adapted to the second communication protocol/standard for the first application device 1310 via the second communication port 1121.

Figure 4:
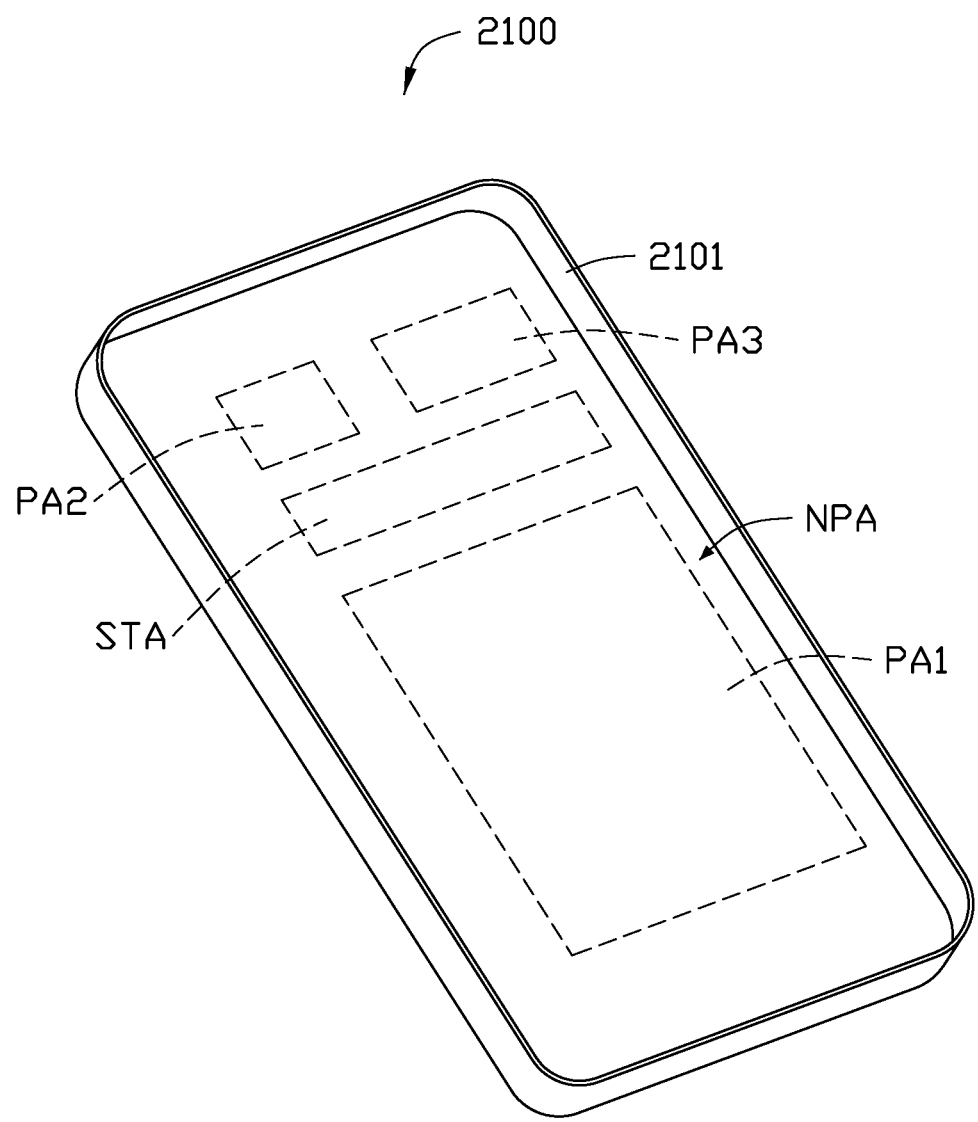
FIG. 4 is a schematic of a workpiece.

FIG. 4 shows a workpiece in one embodiment of the disclosure. As shown in FIG. 4, the workpiece 2100 is a back shell of a cellular phone and has an inner surface 2101. Surface 2101 is divided into a first protection area PA1, a second protection area PA2, a third protection area PA3, a stamp area STA, and a non-protection area NPA. The first protection area PA1 corresponds to a battery area of the cellular phone. The first protection area PA1 is to be covered by a piece of plastic foam to prevent battery damage by impact, for example if the cellular phone is dropped. The second protection area PA2 corresponds to the antenna area, and the second protection area PA2 is to be covered by a piece of plastic foam to prevent antenna damage by impact. The third protection area PA3 corresponds to another area which needs to be protected, and the stamp area STA is to be covered by a piece of stamp. The required thicknesses of the plastic foam and/or the needed material of the plastic foam varies from one area to another, a single piece of foam or cushion is inappropriate. Four application devices can apply stickers by application in the protection areas and the stamp area on the inner surface 2101 of the workpiece 2100. Although the workpiece 2100 in the disclosure is a back shell of a cellular phone, the workpiece may be any object requiring multiple stickers, such as plastic foam, cushion, insulation glue, waterproof glue, and stamp.

The first expansive cooperation device 1410 is, for example, a computer configured to modify the operation of each of the first to fourth application devices 1310 to 1340, via the central control device 1100. For example, if the workpiece is the workpiece 2100 in FIG. 4, the first application device 1310 is configured by the first expansive cooperation device 1410 to apply a piece of plastic foam in the first protection area PA1. The second application device 1320 is configured by the first expansive cooperation device 1410 to apply a piece of plastic foam in the second protection area PA2, the third application device 1330 is configured by the first expansive cooperation device 1410 to apply a piece of stamp in the stamp area STA, and the fourth application device 1340 is configured by the first expansive cooperation device 1410 to apply a piece of plastic foam in the third protection area PA3. Even if the workpiece changes or a new application device is installed on the assembly line apparatus, the first expansive device 1410 is capable of configuring all application devices via the central control device 1100.

In one embodiment, the workpiece 2100, according to the serial number thereof, only needs a piece of plastic foam applied in the first protection area PA1 and a piece of stamp applied in the stamp area STA. The first control signal sent from the first expansive cooperation device 1410 instructs the driving motor 1230 of the transportation device 1200 to stop driving the first wheel 1221 when the workpiece 2100 loaded on the conveyor 1210 arrives the assembly section corresponding to the first application device 1310. The workpiece 2100 is thus temporarily in the assembly section corresponding to the first application device 1310. Afterwards, the first application device 1310 receives the second control signal from the first expansive cooperation device 1410, and the first application device 1310 is controlled by the second control signal to apply a piece of plastic foam in the first protection area PA1 of the workpiece 2100. After the first protection area PA1 is applied with the piece of plastic foam by the first application device 1310, the first application device 1310 sends a completion signal via the central control device 1100 to the first expansive cooperation device 1410. When completion signals from all application devices have been received by the first expansive cooperation device 1410, the first expansive cooperation device 1410 again generates a first control signal to instruct the driving motor 1230 of the transportation device 1200 to drive the first wheel 1221, to move the workpiece 2100 on toward the assembly section corresponding to the second application device 1320.

When the workpiece 2100 arrives at the assembly section corresponding to the second application device 1320, the workpiece 2200 is also in position at the assembly section corresponding to the first application device 1310. Hence, the first control signal sent from the first expansive cooperation device 1410 instructs the driving motor 1230 of the transportation device 1200 to stop driving the first wheel 1221 so that the workpiece 2100 temporarily stays in the assembly section corresponding to the second application device 1320 and the workpiece 2200 temporarily stays in the assembly section corresponding to the first application device 1310. In one embodiment, the first protection area PA1 of the workpiece 2200 needs to be applied with a piece of plastic foam but the second protection area PA2 of the workpiece 2100 does not. The second control signal sent from the first expansive cooperation device 1410 to the first application device 1310 makes the first application device 1310 apply a piece of plastic foam in the first protection area PA1 of the workpiece 2200 and the second control signal sent from the first expansive cooperation device 1410 to the second application device 1320 instructs the second application device 1320 to do nothing. In one embodiment, the second application device 1320 issues a completion signal as a reply when receiving the second control signal. In another embodiment, after receiving the second control signal, the second application device 1320 waits for a predetermined time period, such as 10 seconds, and then issues the completion signal as a reply. The workpiece 2100 is thus not processed by the second application device 1320. Similarly, the first expansive cooperation device 1410 is capable of selecting arbitrarily one or more among the application devices 1310 through 1340 to apply or not apply a sticker on the workpiece.

Figure 5:
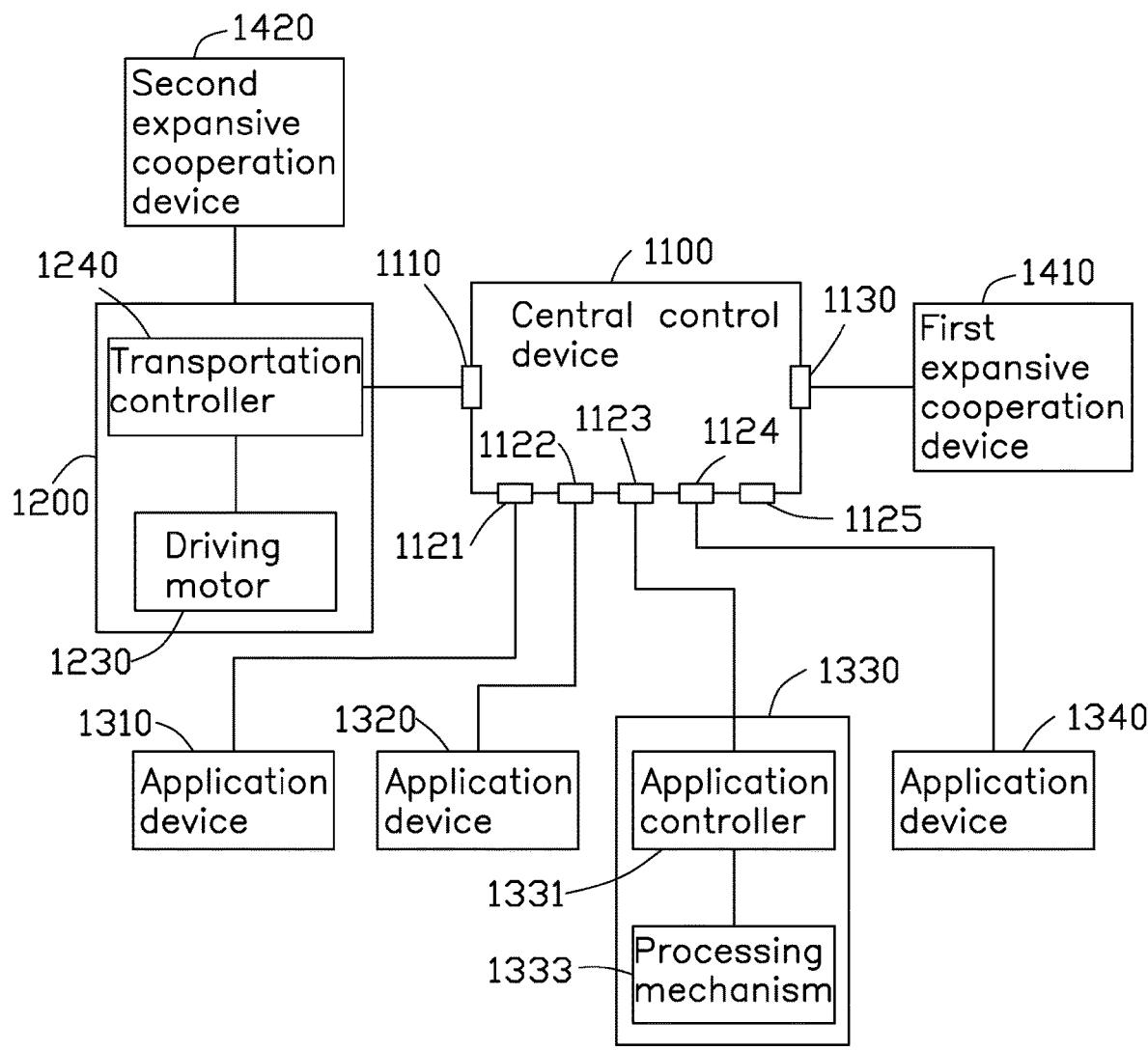
FIG. 5 is a functional block diagram of an assembly line apparatus in another embodiment of the disclosure.

FIG. 5 shows an assembly line apparatus in another embodiment of the disclosure. As shown in FIG. 5, the assembly line apparatus 1001 in this embodiment has a second expansive cooperation device 1420 electronically connected to the transportation device 1200. The second expansive cooperation device 1420 is, for example, an image capturing device. Explicitly, the second expansive cooperation device 1420 is, for example, an image capturing device implemented with charge-coupled device (CCD). In one embodiment, the second expansive cooperation device 1420 is electronically connected to the transportation controller 1240 and communicates with the transportation controller 1240 with TCP/IP protocol so as to send the image information captured thereby to the transportation controller 1240. In one embodiment, the second expansive cooperation device 1420 captures the image information corresponding to the conveyor 1210 and the image information sent to the transportation 1240 from the second expansive cooperation device 1420. Such information is utilized by the transportation controller 1240 for calibrating the driving motor 1230 so as to ensure that the conveyor 1210 moves the workpiece on the conveyor 1210 to the correct position. In another embodiment, the transportation controller 1240 sends the image information via the central control device 110 to the first expansive cooperation device 1410 (the computer) so that the first expansive cooperation device 1410 takes the image information as feedback to perform advance processing for obtaining a correct first control signal and/or second control signal.

Figure 6:
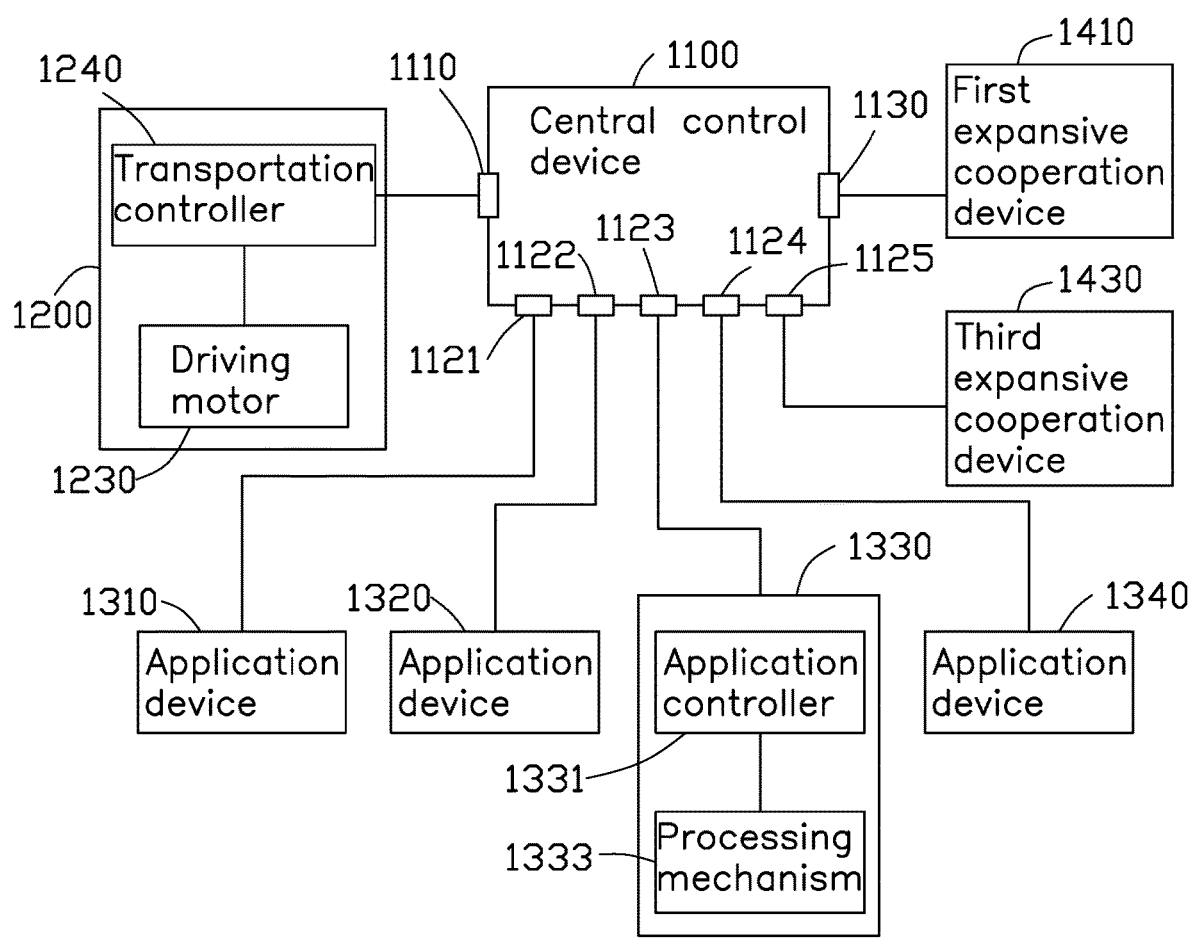
FIG. 6 is a functional block diagram of an assembly line apparatus in yet another embodiment of the disclosure.

FIG. 6 shows the assembly line apparatus for automatic sticker application in another embodiment of the disclosure. As shown in FIG. 6, the assembly line apparatus 1002 for automatic sticker application has a third expansive cooperation device 1430 electronically connected to the central control device 1100. In one embodiment, the third expansive cooperation device 1430 is, for example, a detection device configured to detect whether the sticker on the workpiece is applied correctly. In another embodiment, the third expansive cooperation device 1430 is, for example, a laser engraving device configured to perform a laser engraving procedure, such as to engrave a serial number or a trademark. The third expansive cooperation device 1430 can be any device required by a designer and is not limited. The third expansive cooperation device 1430, for example, communicates with the central control device 1100 with the RS-485 standard and is controlled by the first expansive cooperation device 1410 via the central control device 1100, or can send feedback to the first expansive cooperation device 1410 via the central control device 1100.

Figure 7:
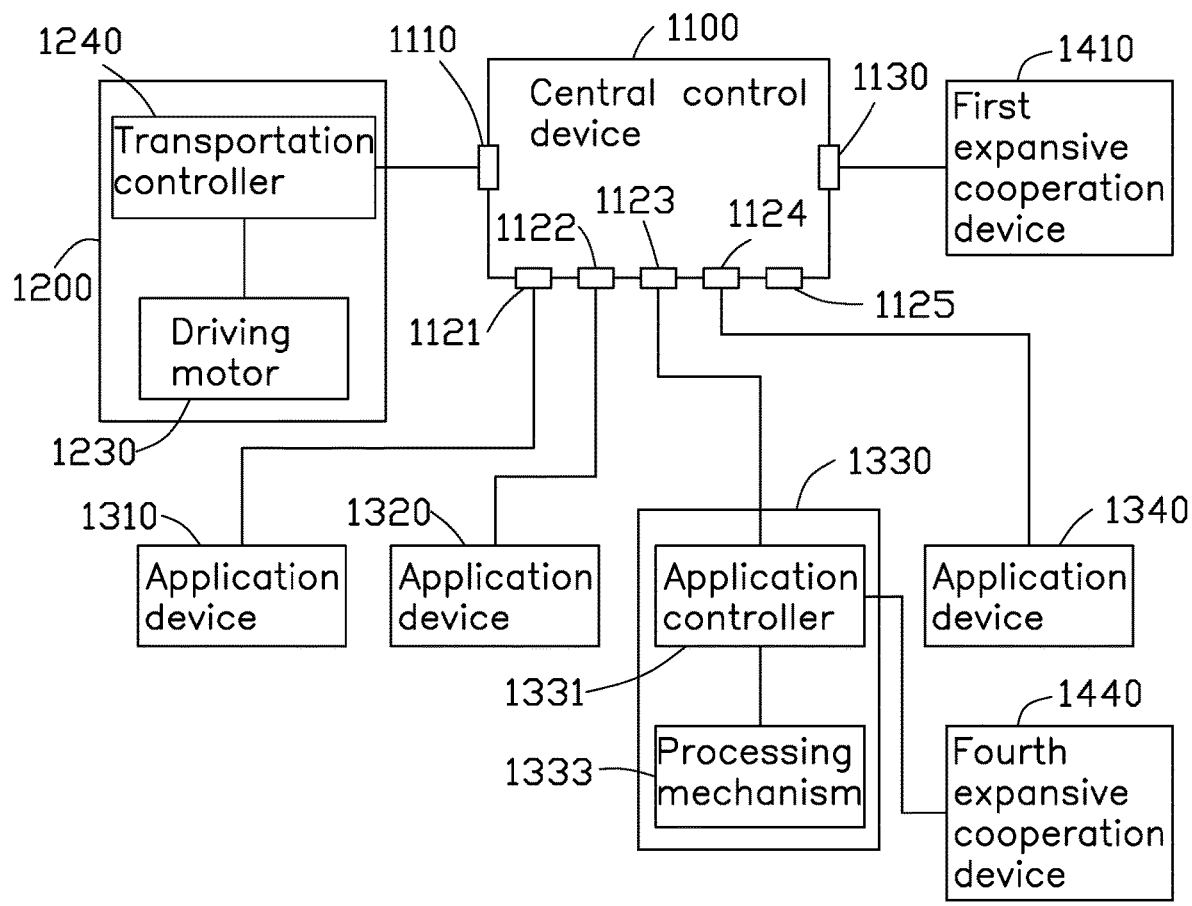
FIG. 7 is a functional block diagram of an assembly line apparatus in another embodiment of the disclosure.

FIG. 7 shows an assembly line apparatus in another embodiment of the disclosure. As shown in FIG. 7, the assembly line apparatus 1003 has a fourth expansive cooperation device 1440 electronically connected to the third application device 1330. The fourth expansive cooperation device 1440 is, for example, an image capturing device. Explicitly, the fourth expansive cooperation device 1440 is, for example, an image capturing device implemented with a charge-coupled device. In one embodiment, the fourth expansive cooperation device 1440 is electronically connected to the application controller 1331 of the third application device 1330 and communicates with the application controller 1331 with the TCP/IP protocol so as to send the image information to the application controller 1331. In one embodiment, the image information sent from fourth expansive cooperation device 1440 to the application controller 1331 is utilized by the application controller 1331 for calibrating the processing mechanism 1333 of the third application device 1330 to ensure that the workpiece on the conveyor 1210 is processed correctly by the processing mechanism 1333. In another embodiment, the application controller 1331 sends image information via the central control device 1100 to the first expansive cooperation device 1410 so that the first expansive cooperation device 1410 is given feedback for advance processing to generate correct first and second control signals. Although the fourth expansive cooperation device 1440 is electronically connected to the third application device 13310 in this embodiment, other configurations may connect the fourth expansive cooperation device to any one or other application device.

Figure 8:
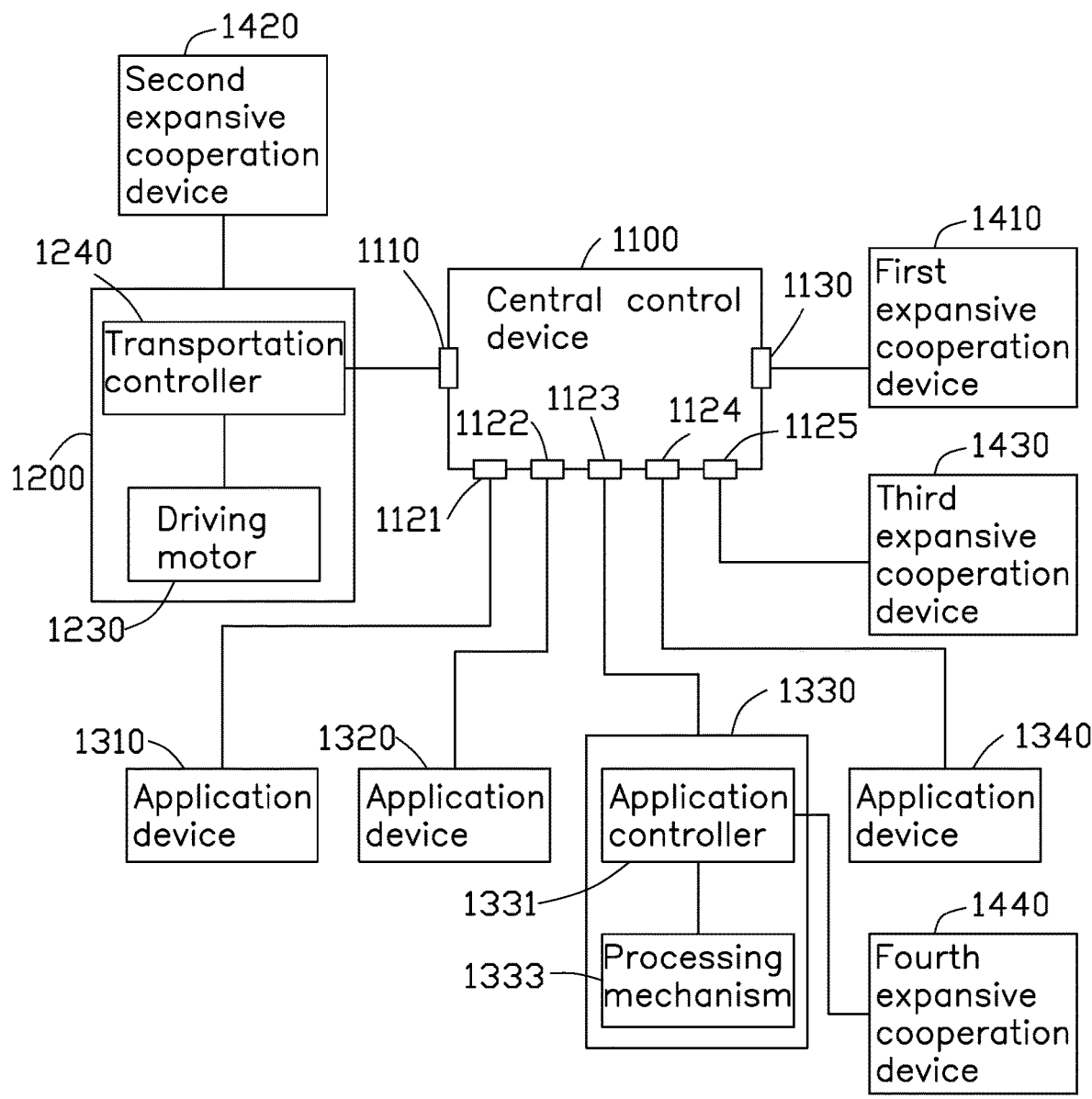
FIG. 8 is a functional block diagram of an assembly line apparatus in another embodiment of the disclosure.

FIG. 8 shows the assembly line apparatus in another embodiment of the disclosure. As shown in FIG. 8, the assembly line apparatus for automatic sticker application 1004 in the embodiment may be seen as representing the embodiments in FIG. 5, FIG. 6, and FIG. 7. Explicitly, the assembly line apparatus for automatic sticker application 1004, compared with the assembly line apparatus 1000 in FIG. 1 and FIG. 2, further has a second expansive cooperation device 1420, a third expansive cooperation device 1430, and a fourth expansive cooperation device 1440. The first expansive cooperation device 1410 is, for example, a computer. The second expansive cooperation device 1420 and the fourth expansive cooperation device 1440 are, for example, image capturing devices. The third expansive cooperation device 1430 is, for example, a detection device. The second expansive cooperation device 1420 is electronically connected to the transportation device 1200, and the fourth expansive cooperation device 1440 is electronically connected to the third application device 1330. The third expansive cooperation device 1430 is electronically connected to the central control device 1100. In one embodiment, the first expansive cooperation device 1410 receives image information via the central control device 1100 from the second expansive cooperation device 1420 and the fourth expansive cooperation device 1440, and receives results of detection from the third expansive cooperation device 1430. This data can be used to determine whether or not the assembly line apparatus needs adjustment and/or maintenance. In another embodiment, the first expansive cooperation device 1410 receives the image information via the central control device 1100 from the second expansive cooperation device 1420 and the fourth expansive cooperation device 1440, and receives the result of detection from the third expansive cooperation device 1430 so as to enable adjustment of the first and second control signals.

The assembly line apparatus for automatic sticker application in one embodiment of the disclosure provides communication ports adapted to a variety of communication protocols/standards so that a variety of devices are capable of intercommunicating and cooperating with each other. The designer of the assembly line has greater freedom to select suitable processing machines for each of the tasks in the assembly line based on the provided solutions. Furthermore, the variety of processing machines, the expansive cooperation device(s), and the computer may be connected within a network so the processing machines and the expansive cooperation device(s) are better capable of cooperating.

The exemplary embodiments shown and described above are only examples. Many details are often found in the art such as the other features of the electronic device. Therefore, many such details are neither shown nor described. Even though numerous characteristics and advantages of the present disclosure have been set forth in the foregoing description, together with details of the structure and function of the present disclosure, the disclosure is illustrative only, and changes may be made in the details, especially in matters of shape, size, and arrangement of the parts within the principles of the present disclosure, up to and including the full extent established by the broad general meaning of the terms used in the claims. It will therefore be appreciated that the exemplary embodiments described above may be modified within the scope of the claims.

What is claimed is:

1. An assembly line apparatus for automatic sticker application, comprising:
a transportation device configured to move at least one workpiece loaded thereon based on a first control signal;
a plurality of application devices, each of the plurality of application devices configured to apply a sticker on a selected area of the at least one workpiece based on a second control signal;
a central control device, comprising:
a first communication port adapted to a first transmission standard and electronically connected to the transportation device; and
a plurality of second communication ports adapted to a second transmission standard, wherein each of the plurality of application devices is electronically connected to one among the plurality of second communication ports; and
a first expansive cooperation device electronically connected to the central control device, the first expansive cooperation device configured to generate the first control signal and the second control signal, to send the first control signal to the transportation device via the central control device, and to send the second control signal to the plurality of application devices via the central control device,
wherein the transportation device moves the at least one workpiece to a plurality of assembly sections corresponding to the plurality of application devices based on the first control signal.

2. The assembly line apparatus in claim 1, wherein the central control device comprises an embedded controller.

3. The assembly line apparatus in claim 2, further comprising a second expansive cooperation device electronically connected to the transportation device and communicating with the transportation device with the first transmission standard.

4. The assembly line apparatus in claim 2, further comprising a third expansive cooperation device electronically connected to one among the plurality of second communication ports.

5. The assembly line apparatus in claim 2, further comprising a fourth expansive cooperation device electronically connected to one among the plurality of application devices and communicating with the connected application device with the first transmission standard.

6. The assembly line apparatus in claim 5, wherein the fourth expansive cooperation device is an image capturing device configured to capture image information and send the image information to the first expansive cooperation device, and the first expansive cooperation device generates the second control signal based on the image information.

7. The assembly line apparatus in claim 1, wherein the second transmission standard is RS-485 standard.

8. The assembly line apparatus in claim 7, further comprising a second expansive cooperation device electronically connected to the transportation device and communicating with the transportation device with the first transmission standard.

9. The assembly line apparatus in claim 7, further comprising a third expansive cooperation device electronically connected to one among the plurality of second communication ports.

10. The assembly line apparatus in claim 7, further comprising a fourth expansive cooperation device electronically connected to one among the plurality of application devices and communicating with the connected application device with the first transmission standard.

11. The assembly line apparatus in claim 1, wherein the first transmission standard is TCP/IP protocol.

12. The assembly line apparatus in claim 11, further comprising a second expansive cooperation device electronically connected to the transportation device and communicating with the transportation device with the first transmission standard.

13. The assembly line apparatus in claim 11, further comprising a third expansive cooperation device electronically connected to one among the plurality of second communication ports.

14. The assembly line apparatus in claim 11, further comprising a fourth expansive cooperation device electronically connected to one among the plurality of application devices and communicating with the connected application device with the first transmission standard.

15. The assembly line apparatus in claim 1, wherein the central control device further comprises a third communication port, and the central control device communicates with the first expansive cooperation device via the third communication port with RS-232 standard.

16. The assembly line apparatus in claim 1, further comprising a second expansive cooperation device electronically connected to the transportation device and communicating with the transportation device with the first transmission standard.

17. The assembly line apparatus in claim 16, wherein the second expansive cooperation device is an image capturing device configured to capture image information and send the image information to the first expansive cooperation device, and the first expansive cooperation device generates the first control signal based on the image information.

18. The assembly line apparatus in claim 1, further comprising a third expansive cooperation device electronically connected to one among the plurality of second communication ports.

19. The assembly line apparatus in claim 1, further comprising a fourth expansive cooperation device electronically connected to one among the plurality of application devices and communicating with the connected application device with the first transmission standard.

20. The assembly line apparatus in claim 19, wherein the fourth expansive cooperation device is an image capturing device configured to capture image information and send the image information to the first expansive cooperation device, and the first expansive cooperation device generates the second control signal based on the image information.

* * * * *